US010148766B2

(12) United States Patent
Gilmore

(10) Patent No.: US 10,148,766 B2
(45) Date of Patent: Dec. 4, 2018

(54) METHODS, SYSTEMS, AND COMPUTER READABLE MEDIA FOR SUBSCRIBER BINDING REPOSITORY RECONFIGURATION

(71) Applicant: Oracle International Corporation, Redwood Shores, CA (US)

(72) Inventor: John Scott Gilmore, Cary, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 277 days.

(21) Appl. No.: 14/939,681

(22) Filed: Nov. 12, 2015

(65) Prior Publication Data

US 2017/0141959 A1 May 18, 2017

(51) Int. Cl.
*H04L 12/24* (2006.01)
*H04L 29/08* (2006.01)
(Continued)

(52) U.S. Cl.
CPC ...... *H04L 67/141* (2013.01); *G06F 17/30365* (2013.01); *G06F 17/30424* (2013.01); *H04L 65/1016* (2013.01)

(58) Field of Classification Search
CPC ............... H04L 67/141; H04L 41/0813; H04L 65/1016; G06F 17/30365; G06F 17/30424
(Continued)

(56) References Cited

U.S. PATENT DOCUMENTS 5,930,806 A 7/1999 Taira et al.
6,098,076 A 8/2000 Rekieta et al.
(Continued)

FOREIGN PATENT DOCUMENTS

CN 103379465 A 10/2013

OTHER PUBLICATIONS

"F5 Signaling Delivery Controller Session Management," Release 4.0.5 https://support.f5.com/ content/kb/en-us/products/traffix-sdc/manuals/product/sdc-session-management-4-0-5/_jcr_content/pdfAttach/download/file.res/sdc-session-management-4-0-5.pdf, pp. 1-41 (Dec. 2014).

*Primary Examiner* — Tesfay Yohannes
(74) *Attorney, Agent, or Firm* — Jenkins, Wilson, Taylor & Hunt, P.A.

(57) ABSTRACT

Methods, systems, and computer readable media for reconfiguring a session binding repository (SBR) database for a data communications network. In one example, a method includes, before reconfiguring the SBR database, selecting a first plurality of SBR servers for storage of a first plurality of SBR records using a first assignment algorithm. While reconfiguring the SBR database, the method includes selecting a second plurality of SBR servers for storage of a second plurality of SBR records using a second assignment algorithm and searching for a first plurality of stored records in the SBR database based on both the first and second assignment algorithms. After reconfiguring the SBR database, the method includes selecting a third plurality of SBR servers for storage of a third plurality of SBR records using the second assignment algorithm and searching for a second plurality of stored records in the SBR database based on the second assignment algorithm and ceasing searching in the SBR database based on the first assignment algorithm.

15 Claims, 8 Drawing Sheets

(51) Int. Cl.
*G06F 17/30* (2006.01)
*H04L 29/06* (2006.01)

(58) Field of Classification Search
USPC .................................. 709/203, 221; 370/328
See application file for complete search history.

(56) References Cited

U.S. PATENT DOCUMENTS

| | | | |
|---|---|---|---|
| 6,453,281 B1* | 9/2002 | Walters | G06F 3/0481 |
| | | | 704/200 |
| 7,634,512 B2 | 12/2009 | Cao et al. | |
| 8,825,060 B2* | 9/2014 | McCann | H04L 45/64 |
| | | | 370/389 |
| 8,903,357 B2 | 12/2014 | Cutler et al. | |
| 8,942,747 B2 | 1/2015 | Marsico | |
| 9,148,388 B2* | 9/2015 | Sprague | H04L 49/35 |
| 2002/0083126 A1* | 6/2002 | Best | G07C 13/00 |
| | | | 709/203 |
| 2005/0149582 A1 | 7/2005 | Wissmann et al. | |
| 2006/0051094 A1* | 3/2006 | Moriwaki | H04J 14/0209 |
| | | | 398/84 |
| 2010/0088304 A1* | 4/2010 | Jackson | G06F 17/30899 |
| | | | 707/706 |
| 2012/0224531 A1* | 9/2012 | Karuturi | H04L 67/327 |
| | | | 370/328 |
| 2012/0226758 A1 | 9/2012 | Sprague et al. | |
| 2013/0339886 A1* | 12/2013 | Batham | G06Q 30/0641 |
| | | | 715/765 |
| 2014/0002101 A1* | 1/2014 | Lussier | G01R 31/04 |
| | | | 324/537 |
| 2014/0164633 A1 | 6/2014 | Bi et al. | |

\* cited by examiner

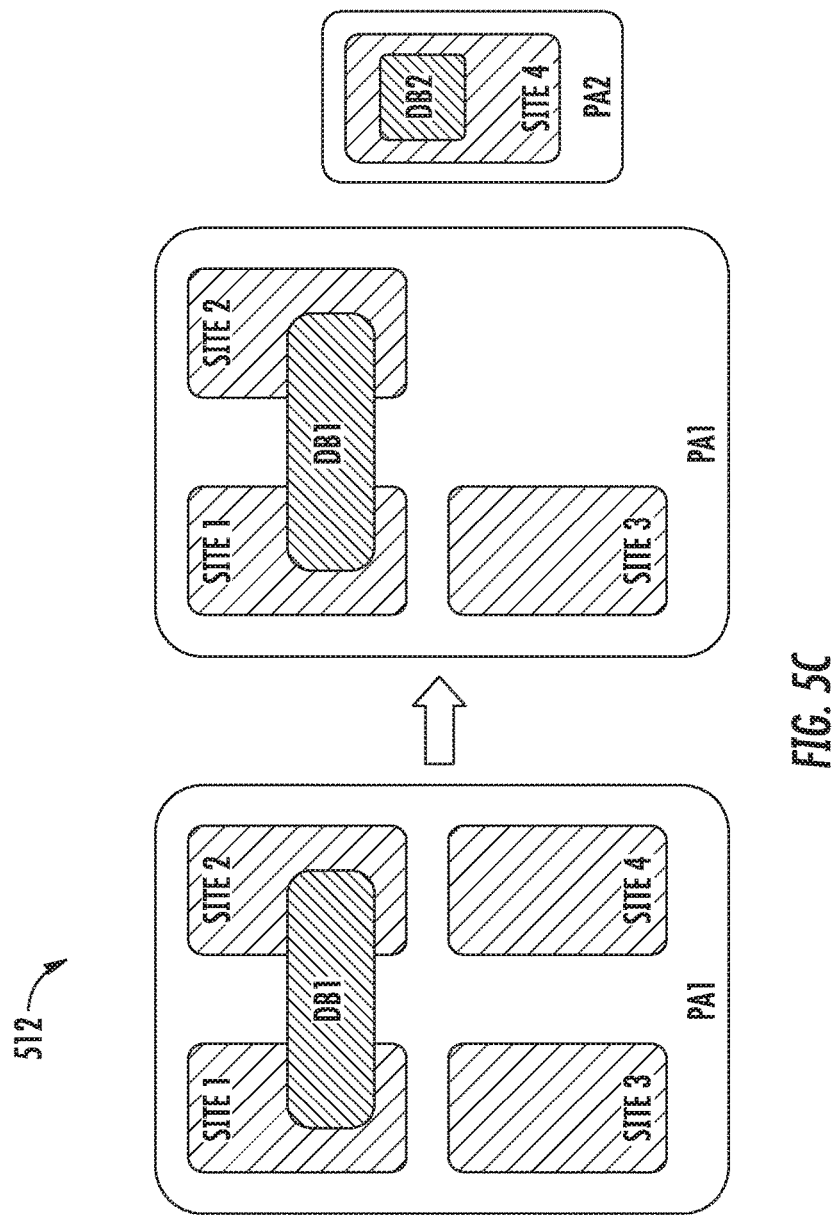

METHODS, SYSTEMS, AND COMPUTER READABLE MEDIA FOR SUBSCRIBER BINDING REPOSITORY RECONFIGURATION

TECHNICAL FIELD

The subject matter described herein relates generally to managing subscriber binding repository (SBR) databases. More particularly, the subject matter described herein relates to methods, systems, and computer readable media for reconfiguration of large in-memory SBR databases without loss of data or loss of real-time access to data.

BACKGROUND

An SBR database is a database in the network that stores subscriber bindings with, e.g., policy charging and rules functions (PCRFs) and bindings for policy sessions. Binding and session data is dynamic and is typically stored in memory only (versus on disk). A policy Diameter routing agent (P-DRA) maintains both subscriber-PCRF and session bindings. The session and binding data can be distributed across multiple tables on multiple different servers. While the industry has addressed the problem of resizing distributed hashed databases (e.g. using a distributed hash table or consistent hashing or both), current solutions do not offer the ability to a) honor data in the old location if it exists and create new records in the new location, and b) make a determination of the location of binding data based on the site where a request for the binding data originates.

Accordingly, in light of these difficulties, there exists a need for methods, systems, and computer readable media for SBR reconfiguration that can be performed efficiently and without disrupting real-time access to existing sessions and bindings.

SUMMARY

The subject matter described herein relates to methods, systems, and computer readable media for reconfiguring a session binding repository (SBR) database for a data communications network. There are a variety of scenarios in which it may be desirable to reconfigure the SBR database maintained by the P-DRA. For example, when network growth causes the SBR capacity of a network to be exceeded, it may be desirable to add new SBR capacity to the network. Or, a customer may decide to move a database from one location to another, or realign mated site relationships. However, it is desirable for SBR reconfiguration to be done efficiently and without disrupting real-time access to existing sessions and bindings. SBR reconfiguration can be complicated because the session and binding data may be distributed across multiple tables on multiple different servers. For example, changing the number of servers hosting a partitioned table changes the server location where a given record is stored. In addition, changing mated site relationships changes where records for a given session are stored.

In one example, a method includes, before reconfiguring a session binding repository (SBR) database for a data communications network, selecting a first plurality of SBR servers for storage of a first plurality of SBR records using a first assignment algorithm. While reconfiguring the SBR database, the method includes selecting a second plurality of SBR servers for storage of a second plurality of SBR records using a second assignment algorithm and searching for a first plurality of stored records in the SBR database based on both the first and second assignment algorithms. After reconfiguring the SBR database, the method includes selecting a third plurality of SBR servers for storage of a third plurality of SBR records using the second assignment algorithm and searching for a second plurality of stored records in the SBR database based on the second assignment algorithm and ceasing searching in the SBR database based on the first assignment algorithm.

In some examples, selecting the first plurality of SBR servers for storage of the first plurality of SBR records includes receiving a plurality of network requests; and for each network request, executing the first assignment algorithm to select a selected SBR server for the network request using a session initiation location for the network request, and creating a session or binding record in the SBR database at the selected SBR server for a subscriber identifier for the network request and a policy node. In some examples, selecting the first plurality of SBR servers includes associating the first plurality of SBR records with a first creation signature in the SBR database, and selecting the second plurality of SBR servers includes associating the second plurality of SBR records with a second creation signature in the SBR database, and searching for the first plurality of stored records in the SBR database based on both the first and second assignment algorithms includes searching using the first and second creation signatures.

In some examples, selecting the third plurality of SBR servers includes determining that reconfiguring the SBR database is complete by searching for records in the SBR database associated with the first assignment algorithm by a first creation signature and determining that no records in the SBR database are associated with the first assignment algorithm by the first creation signature.

In some examples, the SBR database is a binding database storing bindings between subscribers and policy charging and rules function (PCRF) computer systems. The SBR database is configured to be accessible from anywhere in the data communications network and is deployed at one or more mated sites of policy Diameter routing agents (P-DRA) computer system sites.

In some examples, the SBR database is a session database storing session information related to policy sessions for the data communications network. The session database includes at least one instance for each mated site of a plurality of mated sites of policy Diameter routing agents (P-DRA) computer system sites.

In some examples, the SBR database is implemented on a plurality of computer servers and data in the SBR database is stored in random access memory (RAM) on the computer servers, and wherein the first and second assignment algorithms are configured to select servers from the plurality of computer servers. In some examples, reconfiguring the SBR database includes one or more of: mating, un-mating, re-mating, moving, or resizing one or more partitioned database tables.

The subject matter described herein may be implemented in hardware, software, firmware, or any combination thereof. As such, the terms "function", "node" or "module" as used herein refer to hardware, software and/or firmware components for implementing the feature(s) being described. In some examples, the subject matter described herein may be implemented using a non-transitory computer readable medium having stored thereon computer executable instructions that when executed by the processor of a computer cause the computer to perform steps.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 5C shows an example reconfiguration scenario; and

DETAILED DESCRIPTION

Figure 1:
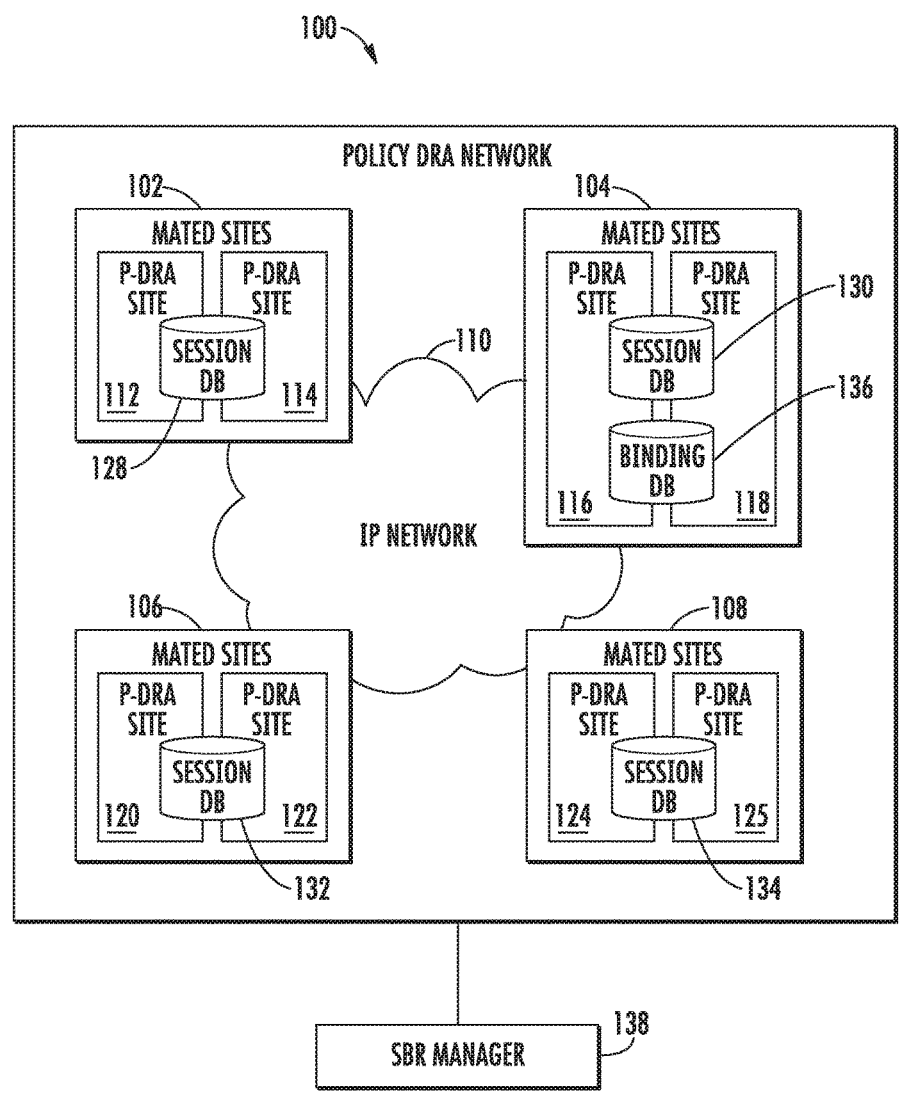
FIG. 1 is a block diagram of an example policy Diameter routing agent (P-DRA) network.

FIG. 1 is a block diagram of an example policy Diameter routing agent (P-DRA) network 100. The policy DRA function offers a scalable, geo-diverse Diameter function that creates a binding between a subscriber and a policy and charging rules function (PCRF) and routes all policy messages for a given subscriber and access point name (APN) to the PCRF that currently hosts that subscriber's policy rules. Additionally, the policy DRA can perform topology hiding to hide the PCRF from specified clients.

A PCRF is a system of one or more computers configured, by virtue of appropriate programming, as part of a 3rd Generation Partnership Project (3GPP) policy charging control (PCC) architecture. The elements of the PCC provide access, resource, and quality-of-service (QoS) control.

In operation, the PCRF functions in real-time or near real-time to determine policy rules in a telecommunication network. The PCRF can, in some cases, operate at the network core and access user information and other specialized functions in a centralized manner. Many PCRFs are regionalized and some serve a fixed (configured) set of subscribers. A PCRF anywhere in the P-DRA network is accessible from policy clients anywhere in the P-DRA network. The PCRF can aggregate information to and from the telecommunications network, operational supports systems, and other sources in real time, which can be useful for the creation of rules and automatically making policy decisions for each user active on the telecommunications network.

Using the PCRF, the telecommunications network can offer multiple services, QoS levels, and charging rules. The PCRF can efficiently and dynamically route and prioritize network traffic. The PCRF can provide a unified view of user context based on one or more of device, network, location, and billing data. The PCRF can provide key inputs to revenue assurance and bandwidth management.

RADIUS is a networking protocol that provides authentication, authorization, and accounting management for users of a network. RADIUS is a client/server protocol that typically runs in the application layer using the user datagram protocol (UDP) for transport. Diameter is a networking protocol that evolved from RADIUS for authentication, authorization, and accounting. Diameter uses reliable transport, e.g., transmission control protocol (TCP) or stream control transmission protocol (SCTP). Diameter applications extend the base protocol by adding new commands and/or attributes, e.g., commands and attributes for use in policy and charging control. A typical Diameter packet includes a Diameter header and a variable number of attribute-value pairs (AVPs) for encapsulating information relevant to the Diameter message.

Referring to FIG. 1, network 100 includes a number of mated sites 102, 104, 106, and 108 that communicate using Diameter and/or RADIUS over an Internet protocol (IP) data communications network 110. In general, mated sites 102, 104, 106, and 108 are geographically dispersed, and one or more of mated sites 102, 104, 106, and 108 could include more than two sites. The session binding repository (SBR) hosts the session and binding databases, which provide a distributed scalable and high availability (HA) database function to the policy DRA function for storing and managing the session data and the subscriber-PCRF binding data.

Network 100 includes two types of SBR databases: binding databases and session databases. The databases are configured, by virtue of appropriate programming and hardware selection, to support large numbers of records, e.g., millions of records. In some examples, binding and session data is dynamic and stored in memory, e.g., entirely in random access memory (RAM).

Binding databases have a network scope, so a binding database has one instance per network. A binding database is configured to be accessible from anywhere in network 100. A binding database can be deployed at one or more mated sites of computer equipment. A binding database stores bindings between subscribers and PCRFs.

Session databases have a mated site scope, so a session database has one instance per mated site. A session database is configured to be accessible from the mated site. A session database stores Diameter session information related to policy sessions.

Mated site 102 includes two P-DRA sites 112 and 114, each of which includes a system of one or more computers configured, by virtue of appropriate programming, to host a session database 128. Mated site 104 includes two P-DRA sites 116 and 118 configured, by virtue of appropriate programming to host a session database 130 and a binding database 136.

Mated site 106 includes two P-DRA sites 120 and 122, each of which includes a system of one or more computers configured, by virtue of appropriate programming, to host a session database 132. Mated site 108 includes two P-DRA sites 124 and 126, each of which includes a system of one or more computers configured, by virtue of appropriate programming, to host a session database 134.

Policy sessions can be established using multiple Diameter interfaces such as Gx, Gxx, Gx-Prime, Rx and S9. A session can be characterized as binding-capable or binding-dependent, depending on whether or not a binding can be created over it.

Gx, Gxx and S9 interfaces are binding-capable

Rx, Rx over S9, and Gx-Prime interfaces are binding-dependent

A session over a binding-capable interface will be eligible to establish a binding to a PCRF, while a session over a binding-dependent interface will rely on an existing binding to a PCRF but cannot create a new binding by itself.

In order for the policy DRA to route all messages from a subscriber (perhaps through multiple interfaces and devices) to the same PCRF, the policy DRA should be able to identify the subscriber by the information in the incoming Diameter request messages. One subscriber can be associated with multiple subscriber identifiers depending on the access networks and device types used.

The subscriber identifiers are also called subscriber keys or keys. Messages that can cause creation of a subscriber-PCRF binding are required to contain the subscriber's device international mobile subscriber identity (IMSI), which can be used to uniquely identify the subscriber. IMSI can be used as the subscriber anchor key in the SBR binding database.

Session initiating messages may also contain additional information to identify the subscriber. This information, which may include a Mobile Station Integrated Services Digital Network (MSISDN) number, an IPv4 address, or an IPv6 address prefix, is referred to as subscriber alternate keys. Database records with alternate keys are established by binding-capable sessions, and can be used to identify the subscriber in binding-dependent sessions.

For example, a Gx CCR-I message contains the IMSI anchor key under normal circumstances and may also contain an MSISDN, an IPv4 address, and an IPv6 address. After a binding is established between the subscriber and a PCRF, binding-dependent sessions containing one or more of the subscriber keys can be routed to the PCRF using an alternate key.

Network 100 includes an SBR manager 138, which can be implemented on a system of one or more computers configured, by virtue of appropriate programming, to manage the SBR databases. In some examples, SBR manager 138 manages reconfiguration of the SBR databases using a status and maintenance graphical user interface (GUI). The GUI can be configured, by virtue of appropriate programming, to allow a user to configure reconfiguration scenarios. The GUI can give the user granular control over the reconfiguration process. The GUI can also be used to provide up-to-date information on progress and anomalies.

In operation, SBR manager 138 can be configured to reconfigure one or more of the SBR databases. SBR manager 138 binds, before reconfiguring the SBR database, binding subscriber identifiers to policy nodes for the data communications network using a first assignment algorithm. While reconfiguring the SBR database, SBR manager 138 binds subscriber identifiers to policy nodes using a second assignment algorithm. SBR manager 138 searches for records in the SBR database based on both the first and second assignment algorithms.

The first and second assignment algorithms can be any appropriate kinds of algorithms for distributing requests across computing resources. For example, the first assignment algorithm can be a hashing algorithm based on the number of different resources to distribute across. The second assignment algorithm can be a hashing algorithm using the same type of hashing as the first algorithm but with a different number of resources to distribute across.

After completion of the SBR database reconfiguration, SBR manager 138 binds subscriber identifiers to policy nodes using the second assignment algorithm. SBR manager 138 searches for records in the SBR database based on the second assignment algorithm and ceases searching for records in the SBR database using the first assignment algorithm.

Figure 2:
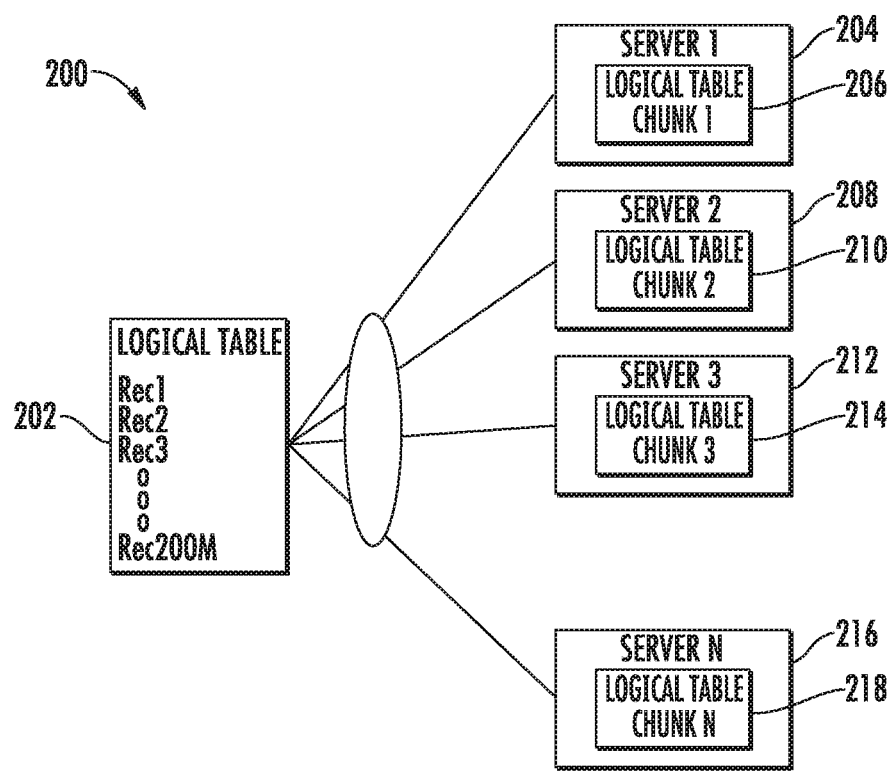
FIG. 2 is a block diagram of an example SBR database implemented using a partitioned database table.

FIG. 2 is a block diagram of an example SBR database implemented using a partitioned database table 200. A logical table 202 includes records for bindings. Since logical table 202 can include a large number of records, logical table 202 may not fit in memory on a single server.

In some cases, implementing logical table 202 requires too many reads writes for the processing power of a single server. Accordingly, logical table 202 is stored across a number of servers 204, 208, 212, and 216, each of which can be implemented as a system of one or more computers configured, by virtue of appropriate programming, to store a logical chunk of logical table 202. Servers 204, 208, 212, and 216 store logical chunks 206, 210, 214, and 218. Partitioned database table 200 can be scaled in size by adding or removing servers.

The example SBR database can include a number of tables, for example, one anchor key table and three alternate key tables. In some cases, each binding table record maintains a list of one or more binding-capable sessions that contains a reference to the binding key. These sessions are referred to using a session reference (SessionRef) instance, which can be a shorter means of identifying a session (shorter than a Diameter Session Id string).

The more permanent keys (IMSI and MSISDN) can be referenced by more than one binding-capable session. These keys typically will not be removed until the last binding-capable session that included the key is terminated. The transient keys (IP Addresses), on the other hand, can be referenced only by a single binding-capable session in most cases.

Because binding capable sessions can originate from different places in the network at nearly the same time, it can be useful to serialize the requests to prevent both from being assigned to different PCRFs. Serialization is accomplished by requiring that binding capable session origination messages (i.e. CCR-I) always contain an IMSI and that the IMSI is always used for creation of new bindings.

Alternate keys provide different ways to identify a subscriber. Alternate keys are created by binding-capable sessions and used by binding-dependent sessions.

For example, a UE attached to a binding-dependent interface like Rx might not have access to the subscriber's IMSI, but might have an IPv6 address that has been temporarily assigned to the subscriber. This IPv6 alternate key can be used to find the subscriber binding and the correct PCRF to route the Rx or Gx-Prime request to, only if that IPv6 alternate key record was previously created by a binding-capable session.

Alternate keys are optional. If all interfaces have access to the IMSI, or anchor key, there may not be a need to create or use alternate keys. Alternate keys are created when they are present in the binding-capable session creation message (CCR-I) and they are assigned a P-DRA binding key priority.

If a binding-capable session initiation message includes multiple alternate keys that are also assigned with a binding key priority, all of those alternate keys can be created when the binding-capable session is established. When a binding-dependent session creation message arrives, which alternate key will be used to find the binding depends to some degree on configuration.

Figure 3:
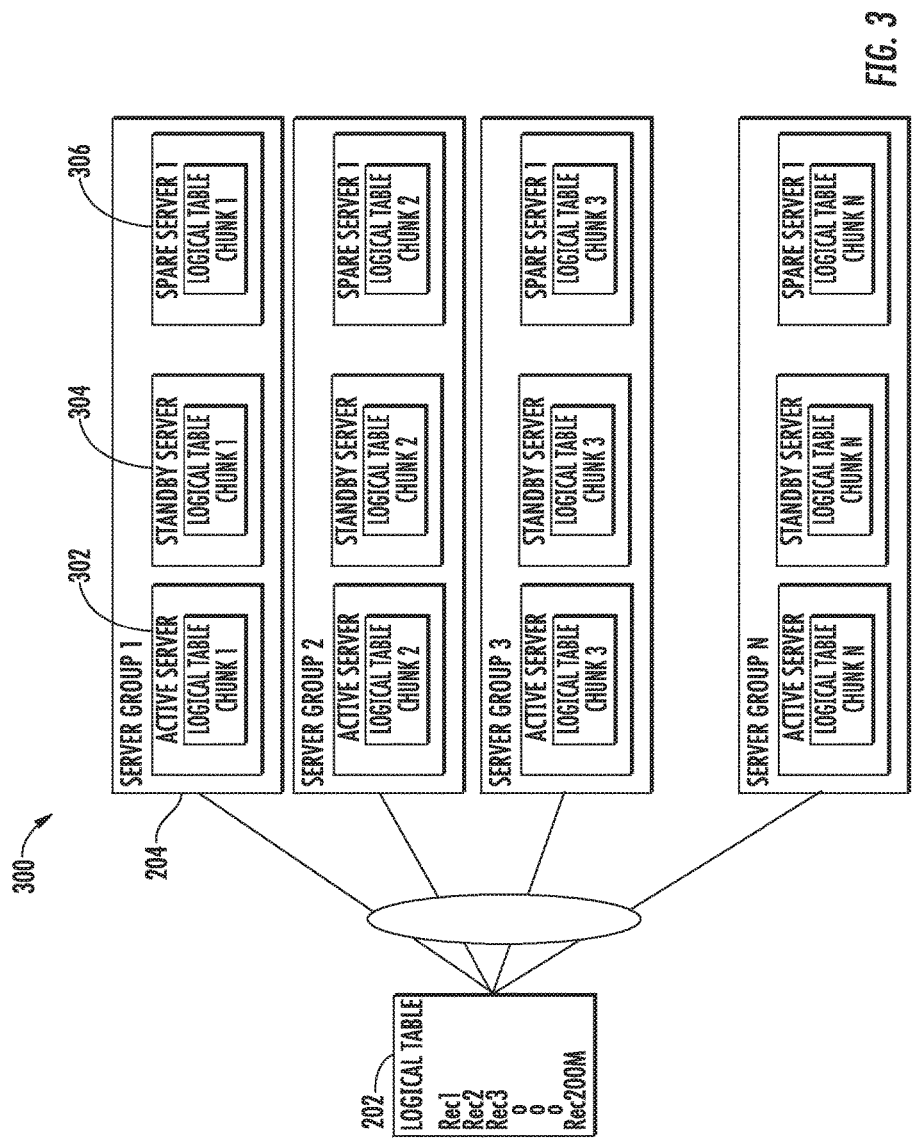
FIG. 3 is a block diagram of an example SBR database showing how SBR data is made durable using example server groups.

P-DRA allows the handling of alternate keys to be configured, e.g., by appropriate programming and/or writing to configuration data. The configuration defines which alternate keys should be used, and the priority order in which to use them. FIG. 3 is a block diagram of an example SBR database 300 showing how SBR data is made durable using example server groups. Logical table 202 is implemented on the server groups to achieve a level of durability of SBR database 300.

P-DRA binding data can be dynamic and change rapidly. In some cases, data cannot be disk-backed due to required access rates. The data is often mission critical and therefore must be durable. In-memory dynamic data can be made durable by maintaining several copies on different servers.

Copies can be geographically dispersed to survive site failure. For example, copies can be kept at different geographic sites having computer equipment and separated across a network, e.g., a wide area network (WAN), to survive site failure.

For data durability, each chunk of logical table 202 is stored in a server group with a number of physical servers. For purposes of illustration, consider server group 204. Server group 204 includes three physical servers, each of which can be implemented as a system of one or more computers. Server group 204 includes an active server 302, a standby server 304, and a spare server 306.

In operation, data is written to active server 302 in server group 204. Data written to active server 302 is replicated to other servers in server group 204, include standby server 304 and spare server 306. In the event of a failure or other shutdown of active server 302, standby server 304 can assume the role of active server 302. If standby server 304 then ceases to operate normally, spare server 306 can assume the role of active server 302.

SBR database 300 can store records for bindings to policy nodes. A binding is a relationship stored in the binding SBR between various subscriber data session identities, such as MSISDN/IP Address(es)/IMSI and the assigned PCRF. A session is a relationship stored in the session SBR that associates additional sessions with a binding. A policy DRA allows distribution of Gx, Gxx, and S9 policy binding-capable sessions and distribution of Gx-Prime and Rx policy binding-dependent sessions across available PCRFs.

Upon receipt of a binding-capable session initiation request, a suggested PCRF pool or sub-pool is selected. The request might be routed to an existing binding; typically, only new bindings are guaranteed to route to the suggested PCRF pool or sub-pool.

Upon receipt of a binding-capable session initiation request for an IMSI for which no existing binding is found, the policy DRA that receives the request attempts to route the request using the suggested PCRF pool or sub-pool. Upon receipt of a binding-capable session initiation request for an IMSI for which no existing binding is found, a new binding can be created using the IMSI, APN, and suggested PCRF pool or sub-pool.

If, when creating the new binding, the record for the IMSI already contains a threshold number of session references, the policy DRA can generate a Diameter error response using the response code configured for an SBR Error condition. When a binding-capable session initiation request results in a new binding, the binding-capable session initiation request is routed to the peer routing table (PRT) mapped to the PCRF pool or sub-pool at the site where the request was received. When the PCRF pool or sub-pool is mapped to a configured PRT table, a counter can be incremented for the PCRF pool or sub-pool.

A default PCRF pool can be configured into the system. Some or all configured APNs will be configured to map to the default PCRF pool. If there is an existing binding for the IMSI that matches the APN, the existing binding will always be used. This may occur even if there is a more specific rule that was configured after the binding was created. This avoids a split-binding scenario. A split binding exists when more than one PCRF is managing Gx sessions for the same subscriber. If there are no existing bindings that match the Gx session, policy DRA uses the PCRF pool selection rules to determine the PCRF pool to which the CCR-I message is to be routed.

After selecting the PCRF pool, policy DRA determines whether there are PCRF sub-pool rules for the selected PCRF pool. The PCRF sub-pool rules can be based on the fully qualified domain name (FQDN) of the Diameter peer that originated the new-binding CCR-I and a priority. If multiple rules match, the highest priority rule is used. If all of the matching rules have the same priority, the more specific rule takes precedence.

If an existing binding is to be used to route a CCR-I, then the PCRF in that binding is used. If a new binding is to be created, after policy DRA has selected the PCRF pool through a combination of the PCRF pool selection rules and the PCRF sub-pool selection rules, then policy DRA selects the PCRF peer that will own the binding. The PRT Table ID mapped to the PCRF pool points to the PRT table to be used for routing the CCR-I message. All existing PRT functionality, including all valid PRT rules and load balancing capabilities, can be used for routing of the CCR-I to an instance within the PCRF pool.

Figure 4:
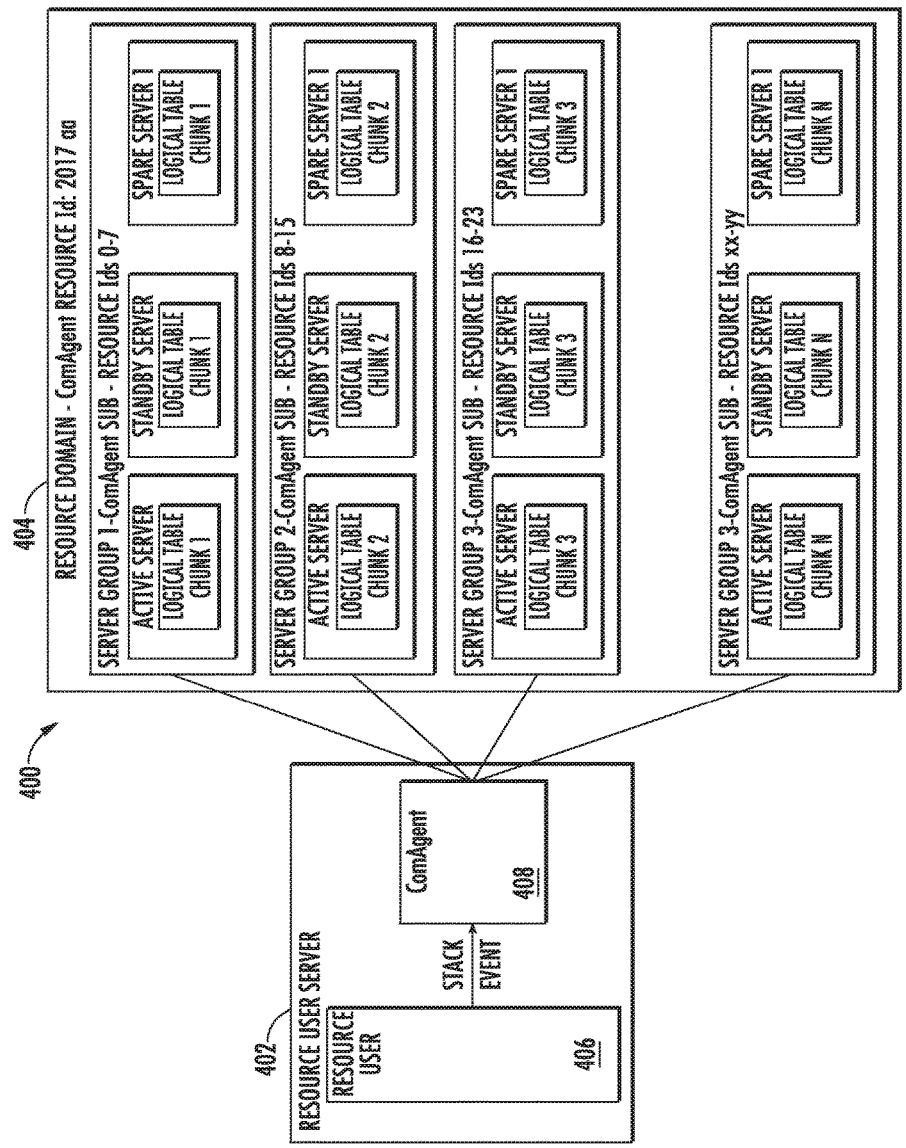
FIG. 4 is a block diagram of an example SBR database illustrating database distribution and access.

FIG. 4 is a block diagram of an example SBR database 400 illustrating database distribution and access. SBR database 400 is implemented on a resource user server 402 and at least one resource domain 404 of computing resources, e.g., computers configured, by virtue of appropriate programming, to implement SBR database 400. Each policy binding and policy and charging session resource domain is assigned a ComAgent Resource Id. Each server group is assigned a set of, e.g., eight ComAgent Sub-Resource-Ids.

In operation, resource user server 402 includes resource user 406 and ComAgent 408. Resource user 406 determines to access a table in the database with a certain key. Resource user 406 determines a ComAgent Resource ID from, e.g., business logic and/or place association.

For example, suppose resource user 406 determines to access table with key "X." Resource user 406 can determine Sub-Resource-Id by calculating: hash(X) MOD numSRs, where numSRs is the number of sub-resource IDs in a server group. The determination of ComAgent Sub-Resource-ID can be sensitive to changes in the number of server groups and hence the total number of Sub-Resource-Ids. A record key stored in server group 2 of the initial resource domain might be stored in server group 5 of the target resource domain.

Once a session or binding database is deployed, it may be useful to reconfigure the database with no loss of data and no loss of access to the data. Scaling the database by changing the number of servers hosting a partitioned table changes the location where a given record would be stored. Changed mated site relationships changes where the session records for a given site should be stored. Moving a binding database from one set of mated sites to another changes the location of binding records.

Figure 5A:
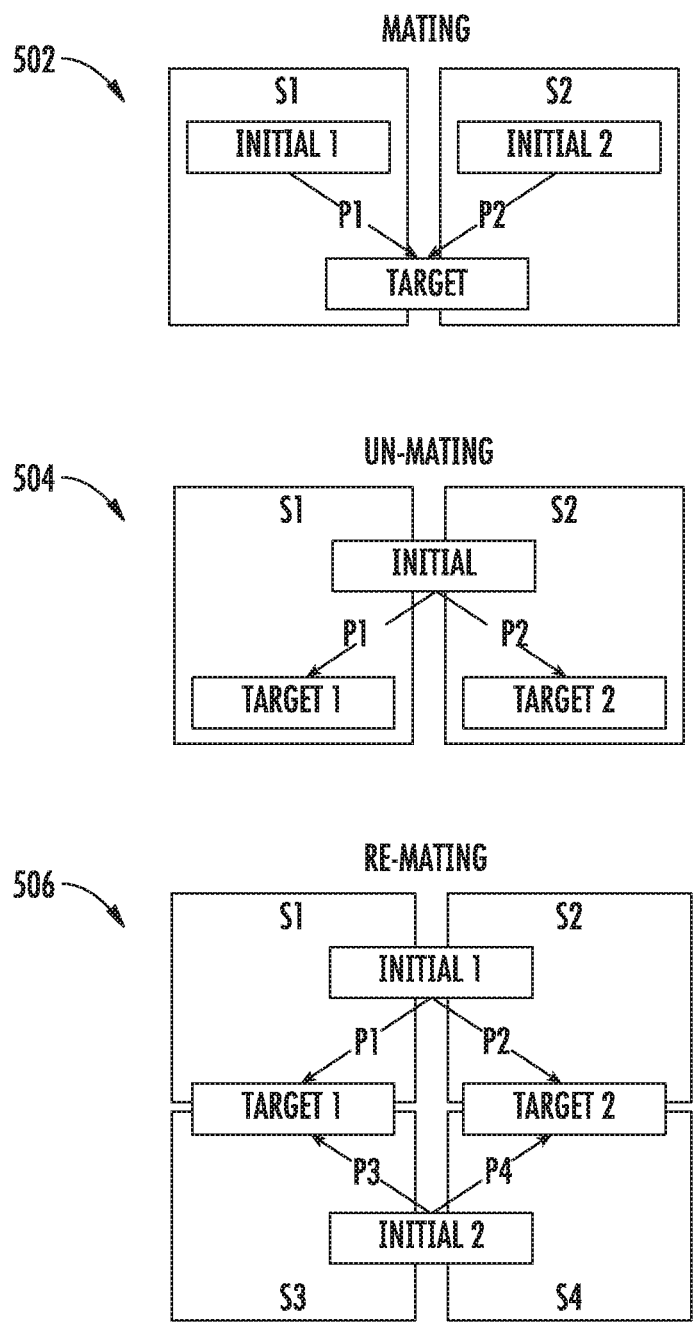
FIG. 5A shows an example mating scenario, an example un-mating scenario, and an example re-mating scenario.
Figure 5B:
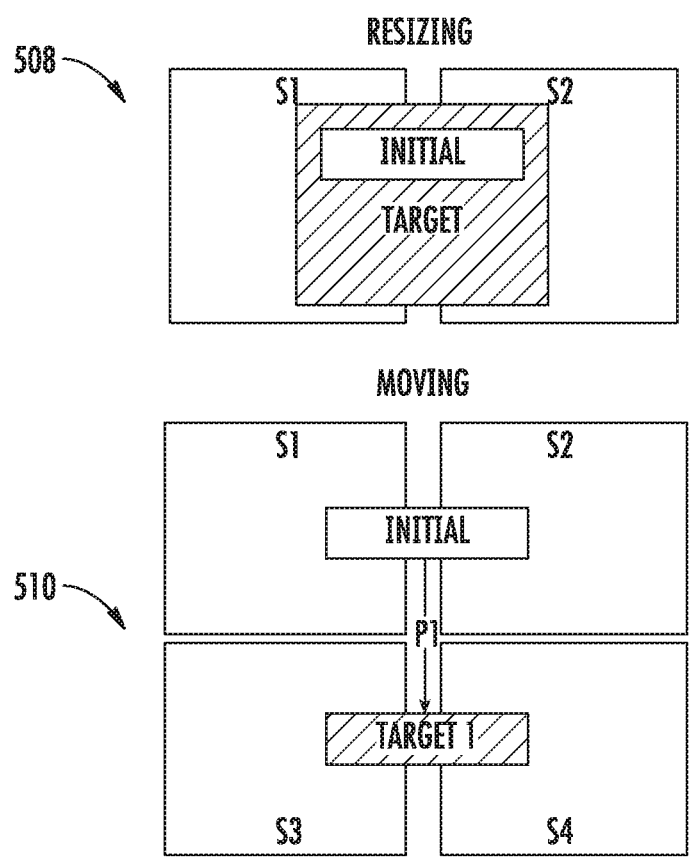
FIG. 5B shows an example resizing scenario and an example moving scenario.

FIGS. 5A-C illustrate various example scenarios for reconfiguring an SBR database. In operation, reconfiguration starts with a transient state for the start of reconfiguration. During the transient state, records are created in both old and new locations, but with a flag indicating that reconfiguration is in progress.

In some cases, this state may last only a few seconds—long enough that all functioning servers should be aware that reconfiguration is in progress. If a server that is not aware that reconfiguration is supposed to be started (e.g., due to a race condition) sees the reconfiguration in progress flag, it is configured to immediately start reconfiguration.

During reconfiguration, reconfiguration business logic is used so that servers accessing the database are aware of the reconfiguration and determine where records should be located. The determination of old and new locations depends on database topology and the site at which the request is being processed. In general, the database creates new records in the new location only. The database looks up records in both locations, e.g., checking the new location first. The database updates records in both locations, e.g., starting with the new location. The database deletes records from both locations.

In some examples, each record includes a creation signature that uniquely identifies the algorithm that was used to place the record. The value of the creation signature can be guaranteed to be different for records created using the old location as compared to records created using the new location. The creation signature can be used to detect when the old and new locations happen to land on the same target server.

Reconfiguration scenarios 502, 504, 506, and 512 generally apply to session databases storing session data. Reconfiguration scenario 508 can apply to both session and binding databases, and reconfiguration scenario 510 generally applies to binding databases. In the example scenarios, sessions are created based on session initiation location. The SBR database will create a session at a site where the sessions is initiated.

Reconfiguration is complete when normal record auditing detects that there are no records remaining having the old creation signature. In some examples, SBR reconfiguration is managed using a status and maintenance GUI. The GUI can be configured, by virtue of appropriate programming, to allow a user to configure reconfiguration scenarios. The GUI can give the user granular control over the reconfiguration process. The GUI can also be used to provide up-to-date information on progress and anomalies.

The GUI can be implemented as a computer server interacting with a user device over a data communications network. A user device can include one or more computers, one or more computer readable mediums storing executable instructions for the computers, and input/output devices such as keyboards, display screens, touchpads, or other types of records or data. For example, the user device can be a desktop computer or mobile phone. The data communications network can be, e.g., a virtual private network (VPN) for an enterprise, the Internet, or a combination of computer networks.

A system administrator can interact with the SBR database using a web browser executing on the user device. A web browser is a software application for retrieving, presenting, and traversing information resources. The information resources can be stored on web servers and accessible over, e.g., the Internet, a corporate intranet, or other computer network.

Web browsers typically use the hypertext transfer protocol (HTTP) to retrieve information from web servers. The server hosting the GUI supplies web pages to the user device for presentation in the web browser. For example, the web pages can include hypertext markup language (HTML) documents and associated image files. HTML is the standard markup language used to create web pages. HTML can be written in the form of HTML elements that include tags, e.g., enclosed in angle brackets. The web browser can read HTML files and render them into visible web pages. The web browser can use the HTML tags and scripts to interpret the content of the page, instead of rendering the tags themselves.

In some examples, other web technology can be used to implement the GUI. The GUI can be built using any appropriate web technology. For example, the GUI can be created using asynchronous JavaScript and XML (AJAX). AJAX is a group of interrelated web development techniques, typically used at the user device, to create asynchronous web applications. Using AJAX, the web browser can send data to and retrieve data from the server asynchronously without interfering with the display and behavior of existing pages.

FIG. 5A shows an example mating scenario 502, an example un-mating scenario 504, and an example re-mating scenario 506. In mating scenario 502, two separate SBR databases, initial 1 and initial 2, are implemented separately at two separate sites, S1 and S2. Reconfiguring the two SBR databases includes mating the two SBR databases into one logical SBR database, "target," implemented using the computer equipment at both sites. Before reconfiguration, the SBR database creates new sessions separately at the separate sites, S1 and S2, according to the origination of the sessions, i.e., so that sessions originating at S1 are stored in initial 1 and sessions originating at S2 are stored in initial 2.

During reconfiguration, the SBR database creates new sessions in the target database and searches for records in both the target database and the initial 1 and initial 2 databases. After reconfiguration, the SBR database creates new sessions in the target database and ceases searching for records in the initial 1 and initial 2 databases. As a result, before reconfiguration, Initial 1 has session data only for sessions initiated at S1, and Initial 2 has session data only for sessions initiated at S2. After reconfiguration, Target has session data for sessions initiated at either S1 or S2.

In un-mating scenario 504, an SBR database, "initial," is implemented across two sites, S1 and S2. Reconfiguring the SBR database includes un-mating the one logical SBR database into two separate logical databases, target 1 and target 2, each implemented at separate sites, S1 and S2. Before reconfiguration, the SBR database creates new sessions in the initial database. During reconfiguration, the SBR database creates new sessions separately in the target 1 and target 2 databases and the SBR database searches for records in both the target 1 and target 2 databases and the initial database. After reconfiguration, the SBR database creates new sessions in the target 1 and target 2 databases, based on the originating sites of the sessions, and ceases searching for records in the initial database.

In re-mating scenario 506, an SBR database, initial 1, contains session data for sessions initiated at either S1 or S2. SBR database initial 2 contains session data for sessions initiated at either S3 or S4. After reconfiguration, SBR database target 1 will contain session data for sessions initiated at S1 or S3, and SBR database target 2 will contain session data for sessions initiated at S2 or S4. The re-mating reconfiguration changes the mate relationships such that before the reconfiguration, S1 and S2 were mates, and S3 and S4 were mates, but after the reconfiguration S1 and S3 are mates, and S2 and S4 are mates.

FIG. 5B shows an example resizing scenario 508 and an example moving scenario 510. In resizing scenario 508, an SBR database, "initial," is implemented by a mated site including sites S1 and S2. In reconfiguring the SBR database, the initial database is expanded to a different, larger database, target. Before reconfiguration, the SBR database creates new bindings or sessions in the initial database. During reconfiguration, the SBR database creates new bindings or sessions in the target database and searches for records in both the target database and the initial database. After reconfiguration, the SBR database creates new bindings or sessions in the target database and ceases searching for records in the initial database.

In moving scenario 510, an SBR database, "initial," is implemented by a mated site including sites S1 and S2. Reconfiguring the SBR database includes moving to a different database, target 1, that is implemented by a mated site includes sites S3 and S4. Before reconfiguration, the SBR database creates new bindings in the initial database. During reconfiguration, the SBR database creates new bindings in the target 1 database and searches for records in both the target 1 database and the initial database. After reconfiguration, the SBR database creates new bindings in the target 1 database and ceases searching for records in the initial database.

FIG. 5C shows an example reconfiguration scenario 512. In reconfiguration scenario 512, a database, DB1, that is shared among four sites, Site 1-Site 4, is carved up so that three of the sites, Site 1-Site 3, share the original database, but the data in site 4 is moved to a new database, DB2. Before the reconfiguration, DB1 contains session data for sessions initiated at any of sites 1-4. After the reconfiguration, DB1 contains session data for sessions initiated at any of sites 1-3 and DB2 contains data only for sessions initiated at site 4. Many variations of this kind of reconfiguration are possible, and carving certain data out of database can be reversed by combining databases.

Figure 6:
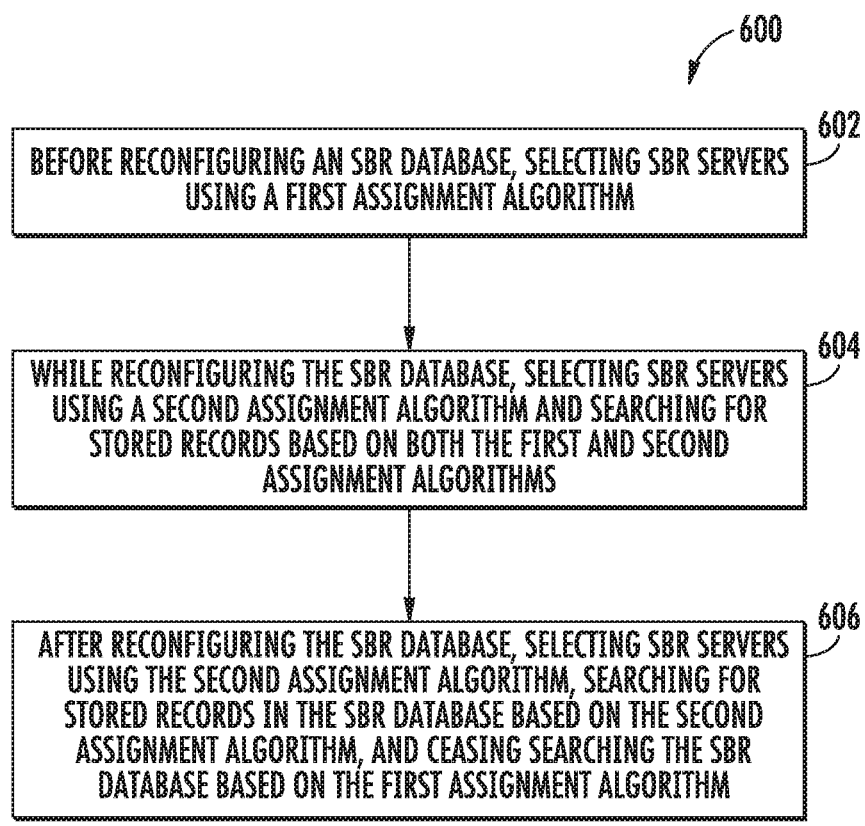
FIG. 6 is a flow diagram of an example method for reconfiguring an SBR database for a data communications network.

FIG. 6 is a flow diagram of an example method 600 for reconfiguring an SBR database for a data communications network. The method is performed by a system of one or more computers, e.g., the SBR manager 138 of FIG. 1 working in combination with Diameter agent servers at various mated sites. Typically, an SBR manager defines the configuration, or intended use, of each SBR database. The Diameter agent servers at each site use the configuration to decide where to create, update, search for, or delete SBR records.

Before reconfiguring the SBR database, the system selects SBR servers for storage of SBR records using a first assignment algorithm (602). Selecting SBR servers can include associating the SBR records with a first creation signature in the SBR database.

The SBR database can be a binding database storing bindings between subscribers and PCRF computer systems. In that case, the SBR database can be configured to be accessible from anywhere in the data communications network and can be deployed at one or more mated sites of policy Diameter routing agents computer system sites. The SBR database can be a session database storing session information related to policy sessions for the data communications network. In that case, the session database can include at least one instance for each mated site of a plurality of mated sites of policy Diameter routing agents computer system sites.

The SBR database can be implemented on a number of computer servers, and data in the SBR database can be stored in random access memory (RAM) on the computer servers. First and second assignment algorithms can be used to select servers from those computer servers. Reconfiguring the SBR database can include one or more of: mating, un-mating, re-mating, or resizing one or more partitioned database tables.

While reconfiguring the SBR database, the system selects SBR servers for storage of SBR records using a second assignment algorithm and searches for stored records in the SBR database based on both the first and second assignment algorithms (604). Selecting SBR servers can include associating the SBR records with a second creation signature in the SBR database. Searching for the stored records in the SBR database based on both the first and second assignment algorithms can include searching using the first and second creation signatures.

After reconfiguring the SBR database, the system selects SBR servers for storage of SBR records using the second assignment algorithm and searches for stored records based on the second assignment algorithm (606). The system ceases searching for records in the SBR database using the first assignment algorithm. The system can determine that reconfiguring the SBR database is complete by searching for records in the SBR database associated with the first assignment algorithm by a first creation signature and determining that no records in the SBR database are associated with the first assignment algorithm by the first creation signature.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

The subject matter described herein can be implemented on general purpose computers appropriately programmed to become special purpose computers, such as SBR database systems, and improves the functionality of SBR database systems by enabling more efficient reconfiguration of SBR databases. Rather than halting the operation of an SBR database during reconfiguration, the subject matter described herein enables an SBR database to be reconfigured while continuing to operate, which can reduce or eliminate downtime in a telecommunications network.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method performed by a system of one or more computers, the method comprising:

before reconfiguring a session binding repository (SBR) database for a data communications network, selecting a first plurality of SBR servers for storage of a first plurality of SBR records using a first assignment algorithm, wherein selecting the first plurality of SBR servers comprises associating the first plurality of SBR records with a first creation signature in the SBR database;

while reconfiguring the SBR database, selecting a second plurality of SBR servers for storage of a second plurality of SBR records using a second assignment algorithm and searching for a first plurality of stored records in the SBR database based on both the first and second assignment algorithms, wherein reconfiguring the SBR database comprises one or more of: mating, un-mating, re-mating, moving, or resizing one or more partitioned database tables, wherein selecting the second plurality of SBR servers comprises associating the second plurality of SBR records with a second creation signature in the SBR database, and wherein searching for the first plurality of stored records in the SBR database based on both the first and second assignment algorithms comprises searching using the first and second creation signatures; and after reconfiguring the SBR database, selecting a third plurality of SBR servers for storage of a third plurality of SBR records using the second assignment algorithm and searching for a second plurality of stored records in the SBR database based on the second assignment algorithm and ceasing searching in the SBR database based on the first assignment algorithm, wherein selecting the third plurality of SBR servers comprises determining that reconfiguring the SBR database is complete by searching for records in the SBR database associated with the first assignment algorithm by a first creation signature and determining that no records in the SBR database are associated with the first assignment algorithm by the first creation signature.

2. The method of claim 1, wherein selecting the first plurality of SBR servers for storage of the first plurality of SBR records comprises:

receiving a plurality of network requests; and for each network request, executing the first assignment algorithm to select a selected SBR server for the network request using a session initiation location for the network request, and creating a session or binding record in the SBR database at the selected SBR server for a subscriber identifier for the network request and a policy node.

3. The method of claim 1, wherein the SBR database is a binding database storing bindings between subscribers and policy charging and rules function (PCRF) computer systems.

4. The method of claim 3, wherein the SBR database is configured to be accessible from anywhere in the data communications network and is deployed at one or more mated sites of policy Diameter routing agents (P-DRA) computer system sites.

5. The method of claim 1, wherein the SBR database is a session database storing session information related to policy sessions for the data communications network.

6. The method of claim 5, wherein the session database comprises at least one instance for each mated site of a plurality of mated sites of policy Diameter routing agents (P-DRA) computer system sites.

7. The method of claim 1, wherein the SBR database is implemented on a plurality of computer servers and data in the SBR database is stored in random access memory (RAM) on the computer servers, and wherein the first and second assignment algorithms are configured to select servers from the plurality of computer servers.

8. A system comprising:

one or more computers; and a session binding repository (SBR) manager, implemented on the one or more computers, for performing operations with one or more Diameter agent servers, the operations comprising:

before reconfiguring a session binding repository (SBR) database for a data communications network, selecting a first plurality of SBR servers for storage of a first plurality of SBR records using a first assignment algorithm, wherein selecting the first plurality of SBR servers comprises associating the first plurality of SBR records with a first creation signature in the SBR database;

while reconfiguring the SBR database, selecting a second plurality of SBR servers for storage of a second plurality of SBR records using a second assignment algorithm and searching for a first plurality of stored records in the SBR database based on both the first and second assignment algorithms, wherein reconfiguring the SBR database comprises one or more of: mating, un-mating, re-mating, moving, or resizing one or more partitioned database tables, wherein selecting the second plurality of SBR servers comprises associating the second plurality of SBR records with a second creation signature in the SBR database, and wherein searching for the first plurality of stored records in the SBR database based on both the first and second assignment algorithms comprises searching using the first and second creation signatures; and after reconfiguring the SBR database, selecting a third plurality of SBR servers for storage of a third plurality of SBR records using the second assignment algorithm and searching for a second plurality of stored records in the SBR database based on the second assignment algorithm and ceasing searching in the SBR database based on the first assignment algorithm, wherein selecting the third plurality of SBR servers comprises determining that reconfiguring the SBR database is complete by searching for records in the SBR database associated with the first assignment algorithm by a first creation signature and determining that no records in the SBR database are associated with the first assignment algorithm by the first creation signature.

9. The system of claim 8, wherein selecting the first plurality of SBR servers for storage of the first plurality of SBR records comprises:

receiving a plurality of network requests; and for each network request, executing the first assignment algorithm to select a selected SBR server for the network request using a session initiation location for the network request, and creating a session or binding record in the SBR database at the selected SBR server for a subscriber identifier for the network request and a policy node.

10. The system of claim 8, wherein the SBR database is a binding database storing bindings between subscribers and policy charging and rules function (PCRF) computer systems.

11. The system of claim 10, wherein the SBR database is configured to be accessible from anywhere in the data communications network and is deployed at one or more mated sites of policy Diameter routing agents (P-DRA) computer system sites.

12. The system of claim 8, wherein the SBR database is a session database storing session information related to policy sessions for the data communications network.

13. The system of claim 12, wherein the session database comprises at least one instance for each mated site of a plurality of mated sites of policy Diameter routing agents (P-DRA) computer system sites.

14. The system of claim 8, wherein the SBR database is implemented on a plurality of computer servers and data in the SBR database is stored in random access memory (RAM) on the computer servers, and wherein the first and second assignment algorithms are configured to select servers from the plurality of computer servers.

15. A non-transitory computer readable medium storing executable instructions that when executed by one or more computers cause the one or more computers to perform operations comprising:

- before reconfiguring a session binding repository (SBR) database for a data communications network, selecting a first plurality of SBR servers for storage of a first plurality of SBR records using a first assignment algorithm, wherein selecting the first plurality of SBR servers comprises associating the first plurality of SBR records with a first creation signature in the SBR database;
- while reconfiguring the SBR database, selecting a second plurality of SBR servers for storage of a second plurality of SBR records using a second assignment algorithm and searching for a first plurality of stored records in the SBR database based on both the first and second assignment algorithms, wherein reconfiguring the SBR database comprises one or more of: mating, un-mating, re-mating, moving, or resizing one or more partitioned database tables, wherein selecting the second plurality of SBR servers comprises associating the second plurality of SBR records with a second creation signature in the SBR database, and wherein searching for the first plurality of stored records in the SBR database based on both the first and second assignment algorithms comprises searching using the first and second creation signatures; and
- after reconfiguring the SBR database, selecting a third plurality of SBR servers for storage of a third plurality of SBR records using the second assignment algorithm and searching for a second plurality of stored records in the SBR database based on the second assignment algorithm and ceasing searching in the SBR database based on the first assignment algorithm,
- wherein selecting the third plurality of SBR servers comprises determining that reconfiguring the SBR database is complete by searching for records in the SBR database associated with the first assignment algorithm by a first creation signature and determining that no records in the SBR database are associated with the first assignment algorithm by the first creation signature.

\* \* \* \* \*